(12) United States Patent
Vaidyanathan et al.

(10) Patent No.: US 7,809,984 B2
(45) Date of Patent: Oct. 5, 2010

(54) IN-SITU THERMAL MARGINING OF COMPUTER SYSTEMS FOR ENHANCED RELIABILITY TESTING

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 491 days.

(21) Appl. No.: 11/787,026

(22) Filed: Apr. 12, 2007

(65) Prior Publication Data

US 2008/0255710 A1 Oct. 16, 2008

(51) Int. Cl.
*G06F 11/00* (2006.01)
(52) U.S. Cl. ...................................................... 714/25
(58) Field of Classification Search .................... 714/25, 714/40
See application file for complete search history.

(56) References Cited

U.S. PATENT DOCUMENTS

| | | | | |
|---|---|---|---|---|
| 6,271,024 B1* | 8/2001 | Sve et al. | ................. | 435/303.1 |
| 6,480,809 B1* | 11/2002 | Slaight | ...................... | 702/186 |
| 6,950,773 B1* | 9/2005 | Gross et al. | ................. | 702/132 |
| 7,313,500 B2* | 12/2007 | Morman | ..................... | 702/132 |
| 7,436,059 B1* | 10/2008 | Ouyang | ..................... | 257/712 |
| 2004/0128101 A1* | 7/2004 | Hermerding, II | ............ | 702/136 |
| 2005/0071117 A1* | 3/2005 | Escobar et al. | .............. | 702/132 |
| 2006/0290365 A1* | 12/2006 | Riedlinger et al. | .......... | 324/760 |
| 2008/0244330 A1* | 10/2008 | Floyd et al. | ................... | 714/47 |

* cited by examiner

*Primary Examiner*—Bryce P Bonzo
(74) *Attorney, Agent, or Firm*—Park, Vaughan & Fleming LLP; Anthony P. Jones

(57) ABSTRACT

Embodiments of the present invention provide a system that dynamically controls a temperature profile within a computer system by generating computer system activity. The system starts by receiving a desired temperature profile. The system then generates a load profile based on the desired temperature profile, wherein the load profile specifies operations to be performed by the computer system. The system next executes the load profile on the computer system to generate computer system activity, wherein the computer system activity causes the desired temperature profile in the computer system.

20 Claims, 4 Drawing Sheets

IN-SITU THERMAL MARGINING OF COMPUTER SYSTEMS FOR ENHANCED RELIABILITY TESTING

RELATED APPLICATIONS

The subject matter of this application is related to the subject matter in a co-pending non-provisional application by inventors Kalyanaraman Vaidyanathan, Kenny C. Gross, and Roger E. Blythe entitled, "Dynamically Controlling a Temperature Profile in a Disk Drive for a Temperature-Dependent Reliability Study," having Ser. No. 11/471,206, and filing date 20 Jun. 2006.

BACKGROUND

1. Field of the Invention

Embodiments of the present invention relate to techniques for performing reliability tests on computer systems. More specifically, embodiments of the present invention relate to a method and an apparatus for dynamically controlling a temperature profile within a computer system to facilitate temperature-dependent reliability studies on the computer system.

2. Related Art

Computer system manufacturers routinely evaluate the reliability of computer systems to ensure that the computer systems meet or exceed reliability requirements of their customers. Typically, computer system reliabilities are determined through "reliability-evaluation studies." These reliability-evaluation studies can include "accelerated-life studies," which accelerate the failure mechanisms of the computer system, or "repair-center reliability evaluations" in which the computer system manufacturer tests computer systems returned from the field. These types of tests typically involve using environmental stress-test chambers to hold and/or cycle one or more stress variables (e.g. temperature, humidity, radiation, etc.) at levels that are believed to accelerate failure mechanisms within a computer system.

In some cases, the failure mechanisms coincide with small variations in the internal temperature of the computer system. There are several theoretical explanations for such behavior, including changes in mechanical stresses, delamination of bonded components, thermal expansion effects on interconnects and soldered joints, exacerbation of microscopic electrostatic discharge effects, and other component reliability phenomena that are affected by temperature gradients and temperature cycling.

One possible way to determine if a computer system is subject to failure from temperature variations is to place the computer system into a thermal chamber where temperature is cycled in an effort to accelerate mechanisms that can lead to failure. This type of testing requires the computer system to be shipped to a facility with a thermal chamber. At the facility, the computer system is placed in the thermal chamber and its temperature is cycled for a fixed time interval (e.g., 100 Hrs or 500 Hrs). The computer system is then removed from the test chamber for functionality testing.

Unfortunately, using a thermal chamber has several drawbacks. First, it requires the computer system to be shipped to the test facility, which involves time and expense. Second, it is usually not possible to run cables into the testing chamber to perform live monitoring of the computer system while it is in the thermal chamber. Consequently, at the end of the predetermined time interval, the computer system is removed from the thermal chambers and is evaluated "ex-situ." Hence, thermal chamber studies yield only pass/fail information for the given interval, without identifying the exact times for the onset of degradation in the computer system. Note that it is desirable to obtain the exact times and/or temperature profiles of computer system failures to facilitate accurate long-term reliability projections (and to provide accurate information about failure mechanisms during repair-center reliability evaluations).

Hence, what is needed is a method and apparatus for performing in-situ temperature testing for enhanced reliability without the above-described problems.

SUMMARY

Embodiments of the present invention provide a system that dynamically controls a temperature profile within a computer system by generating computer system activity. The system starts by receiving a desired temperature profile. The system then generates a load profile based on the desired temperature profile, wherein the load profile specifies operations to be performed by the computer system. The system next executes the load profile on the computer system to generate computer system activity, wherein the computer system activity causes the desired temperature profile in the computer system.

In some embodiments, the system uses a feedback and control loop to facilitate obtaining the desired temperature profile in the computer system.

In some embodiments, the system obtains the desired temperature profile using the feedback and control loop by: (1) measuring a current temperature profile of the computer system; (2) computing a difference between the current temperature profile and the desired temperature profile; (3) adjusting the load profile based on the difference; and (4) executing the adjusted load profile on the computer system.

In some embodiments, when measuring the temperature profile of the computer system, the system uses a telemetry system to measure at least one temperature in the computer system.

In some embodiments, when generating the load profile, the system specifies a level of activity for at least one component in the computer system based on an amplitude and a period of the desired temperature profile.

In some embodiments, when specifying a level of activity for at least one component in the computer system, the system generates a sequence of computer system operations that cause the at least one component to perform at the level of activity.

In some embodiments, the system monitors the computer system to detect a temperature-dependent computer system failure. If a computer system failure occurs, the system records the time and conditions when the computer system failure occurs.

In some embodiments, the desired temperature profile is cyclical, which facilitates performing an accelerated temperature reliability test on the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), flash memory or other solid-state devices, or any device capable of storing data usable by a computer system.

Overview

Embodiments of the present invention perform in-situ temperate cycling within computer systems without having to ship the computer systems to an outside testing facility. More specifically, embodiments of the present invention include a load-generation mechanism that is integrated with continuous system telemetry that monitors computer system's internal temperatures and performance. The load-generation mechanism generates a load profile that, when executed by the computer system, causes operational activity which can in turn cause temperature profiles with desired amplitudes in the computer system or within components in the computer system.

Computer System

Figure 1:
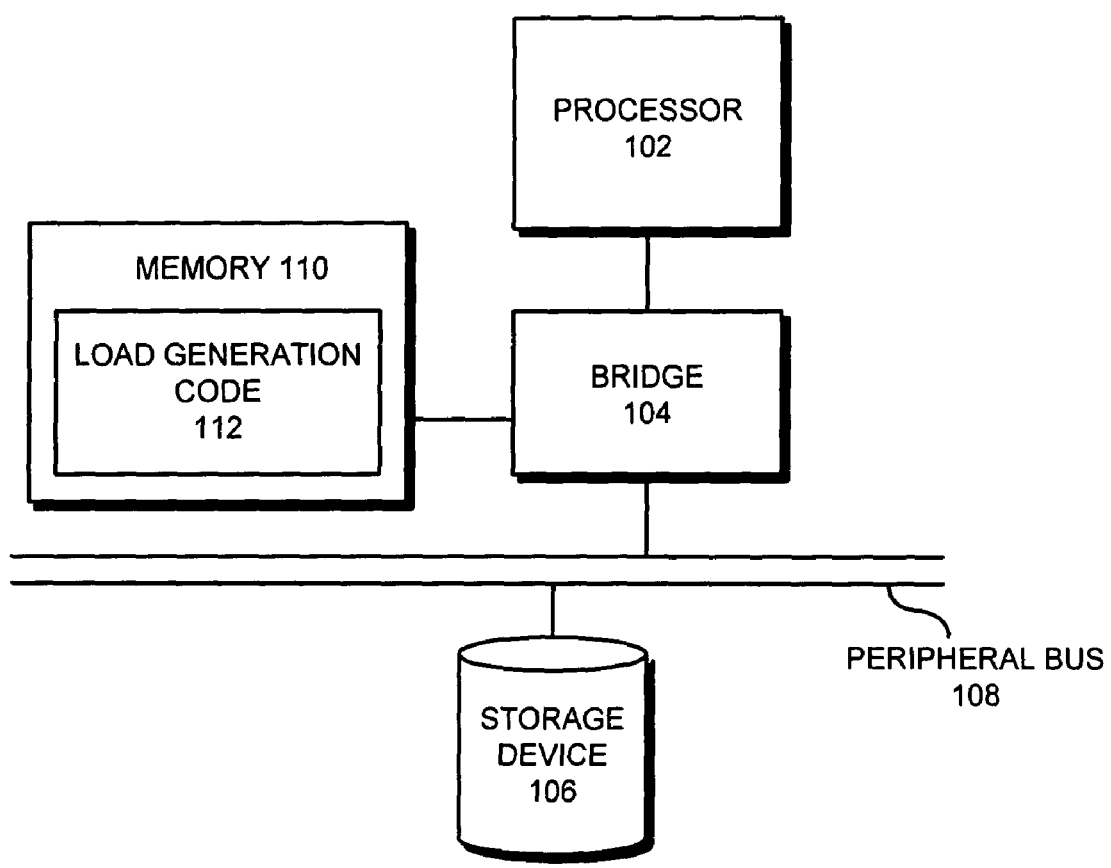
FIG. 1A illustrates a computer system in accordance with embodiments of the present invention.

FIG. 1 illustrates a computer system 100 in accordance with embodiments of the present invention. As illustrated in FIG. 1, computer system 100 includes processor 102, which is coupled to a memory 110 and a peripheral bus 108 through bridge 104. Bridge 104 can generally include any type of circuitry for coupling the components of computer system 100 together.

Computer system 100 can also include other components which are not shown in FIG. 1. For example, along with processor 102, bridge 104, and memory 110, a system board in computer system 100 can be coupled to audio and graphics controllers, network controllers, disk controllers, peripheral bus controllers, memory controllers, application specific integrated circuits (ASICS), additional memory, and other components. In addition, computer system 100 can be coupled through peripheral bus 108 separate peripheral devices such as audio and graphics cards, network cards, additional disk drives or optical drives, and other peripheral devices.

Processor 102 communicates with storage device 106 through bridge 104 and peripheral bus 108. Storage device 106 can include any type of non-volatile storage device that can be coupled to a computer system. This includes, but is not limited to, magnetic, optical, and magneto-optical storage devices. In embodiments of the present invention, storage device 106 comprises a single hard-disk drive (HDD). In other embodiments of the present invention, storage device 106 is a storage array which comprises an array of hard-disk drives (HDDs).

Processor 102 communicates with memory 110 through bridge 104. Memory 110 can include any type of memory that can store code and data for execution by processor 102. As illustrated in FIG. 1, memory 110 contains load-generation code 112. Load-generation code 112 contains instructions for generating computational operations in computer system 100, wherein the computational operations are used to dynamically control the computer system 100's internal temperature. Load-generation code 112 is described in more detail below with reference to FIG. 2 and FIG. 3.

Although the present invention is described in the context of computer system 100, embodiments of the present invention operate on any type of computing device where the temperature of the computer system or components in the computer system can be dynamically controlled by performing sequences of computational operations. Hence, the present invention is not limited to the computer system 100 illustrated in FIG. 1.

Dynamically Controlling a Temperature Profile within a Computer System

Figure 2A:
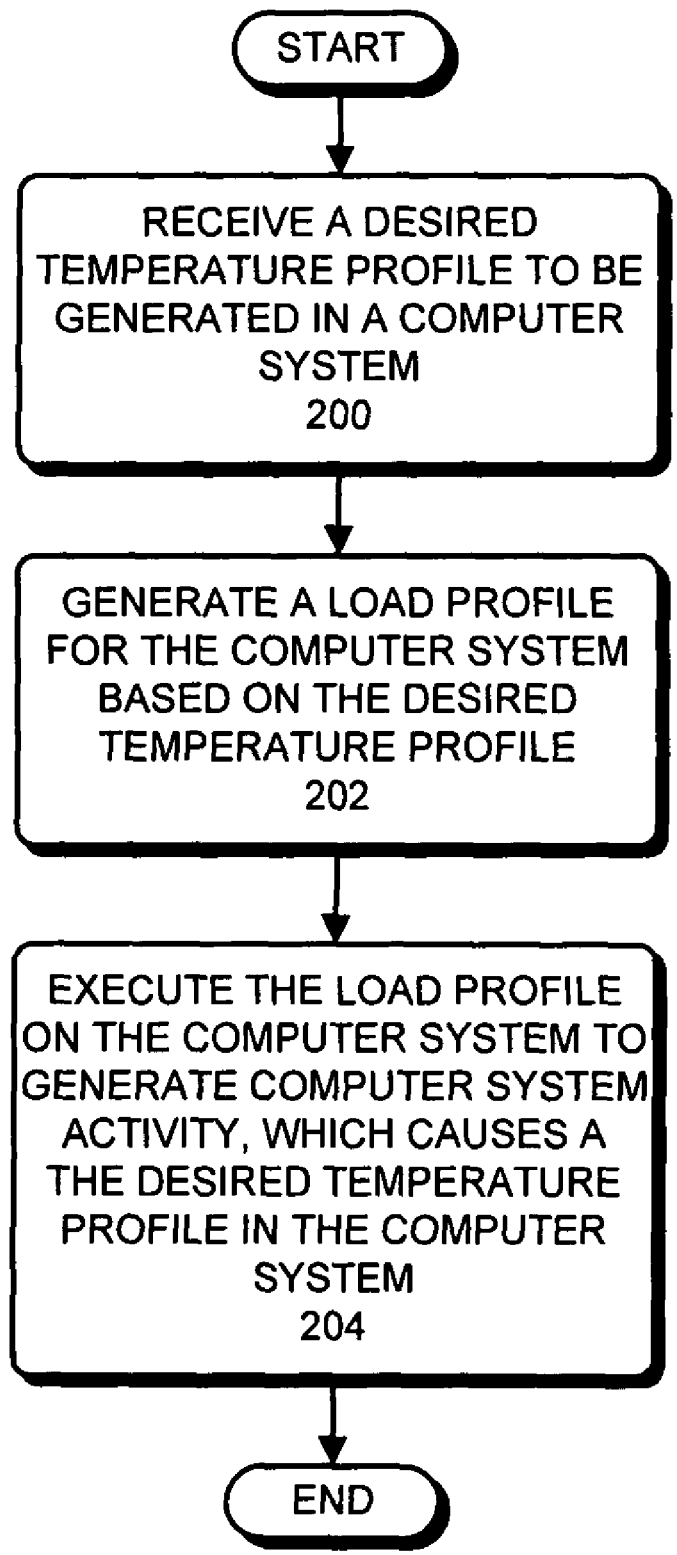
FIG. 2A presents a flowchart illustrating the process of dynamically controlling a temperature profile within a computer system by performing computational operations in accordance with embodiments of the present invention.

FIG. 2A presents a flowchart illustrating the process of dynamically controlling a temperature profile within a computer system by performing computational operations in accordance with embodiments of the present invention.

The system starts by receiving a desired temperature profile to be generated in the computer system (step 200). This temperature profile can be received: from a user, from a program running on the computer system, or from another source.

In some embodiments of the present invention, the desired temperature profile is similar to the temperature profile pattern generated in a thermal chamber. For example, the desired temperature profile can be cyclical, which simulates ramping the temperature up and down in an accelerated-life study. The desired temperature profile can include, but is not limited to, a square-wave profile, a sinusoidal profile, a saw-tooth profile, or other waveform profiles. Alternatively, the waveform profile can be non-cyclical, such as a random temperature profile.

Next, the system generates a load profile for the computer system based on the desired temperature profile (step 202). The load profile specifies time-dependent operations to be performed by the computer system. More specifically, the load profile specifies frequency and type of the operations to be performed by the computer system based on amplitude and period of the desired temperature profile. The frequency of the operations specifies how many operations are performed per unit of time, while the type of operations specifies which components in the computer system (processor, peripheral device, controller, etc.) perform the operation. Typically, higher frequencies generate heavier computer system or component activity, thereby causing a higher temperature in the computer system or component.

In embodiments of the present invention, the load profile can be generated by computer code or a script such as memory read/write load-generation code 112 (see FIG. 1). When generating the load profile, load-generation code 112 generates a sequence of instructions that cause components in the computer system to perform desired operations. For example, load-generation code 112 can create a sequence of load and store instructions which cause processor 102 and memory 110 (among other computer system components) to perform a series of loads and stores between processor 102 and memory 110. In another example, load-generation code 112 can create a sequence of computational instructions that cause circuitry within processor 1002 to execute computational operations.

More generally, load-generation code 112 can create a sequence of instructions that causes a particular component or group of components in the computer system to perform operations while leaving other components idle. In this way, a temperature profile can be induced in a component or a group of components.

Figure 2B:
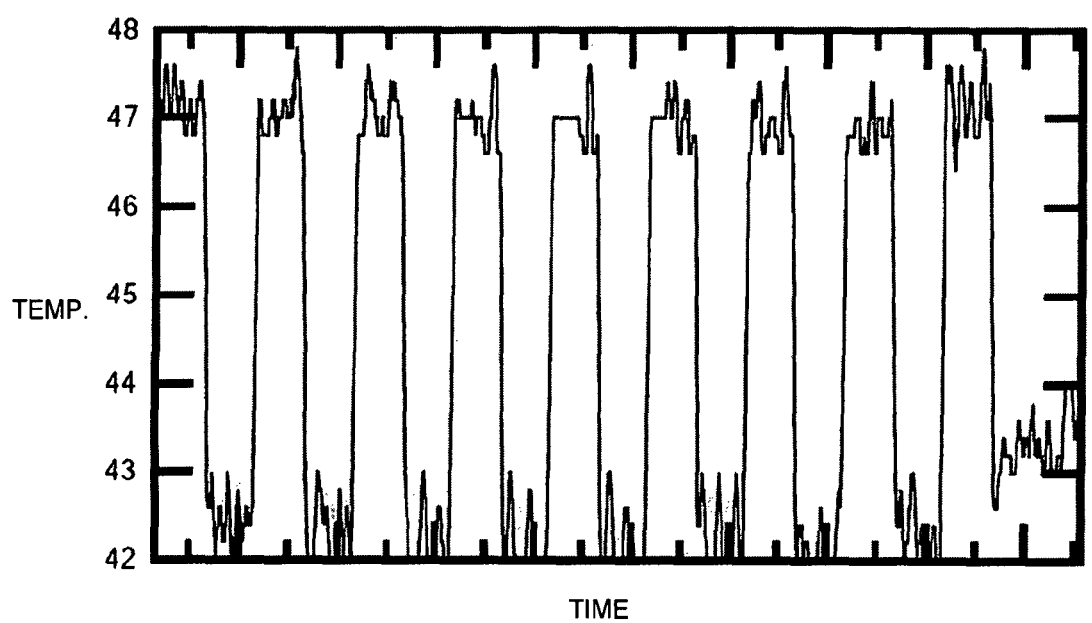
FIG. 2B presents an exemplary temperature profile from a computer system executing a load profile in accordance with embodiments of the present invention.

The system then executes the load profile to generate computer system activity, which causes the desired temperature profile in the computer system (step 204). FIG. 2B presents an exemplary temperature profile from a computer system executing a load profile in accordance with embodiments of the present invention.

Feedback Mechanism

Given the variation in computer system components and environmental conditions, the initial temperature profile generated by the load profile in the computer system may not match the desired temperature profile. However, in some embodiments of the present invention, a feedback-and-control mechanism adjusts the temperature profile toward the desired temperature profile.

Figure 3:
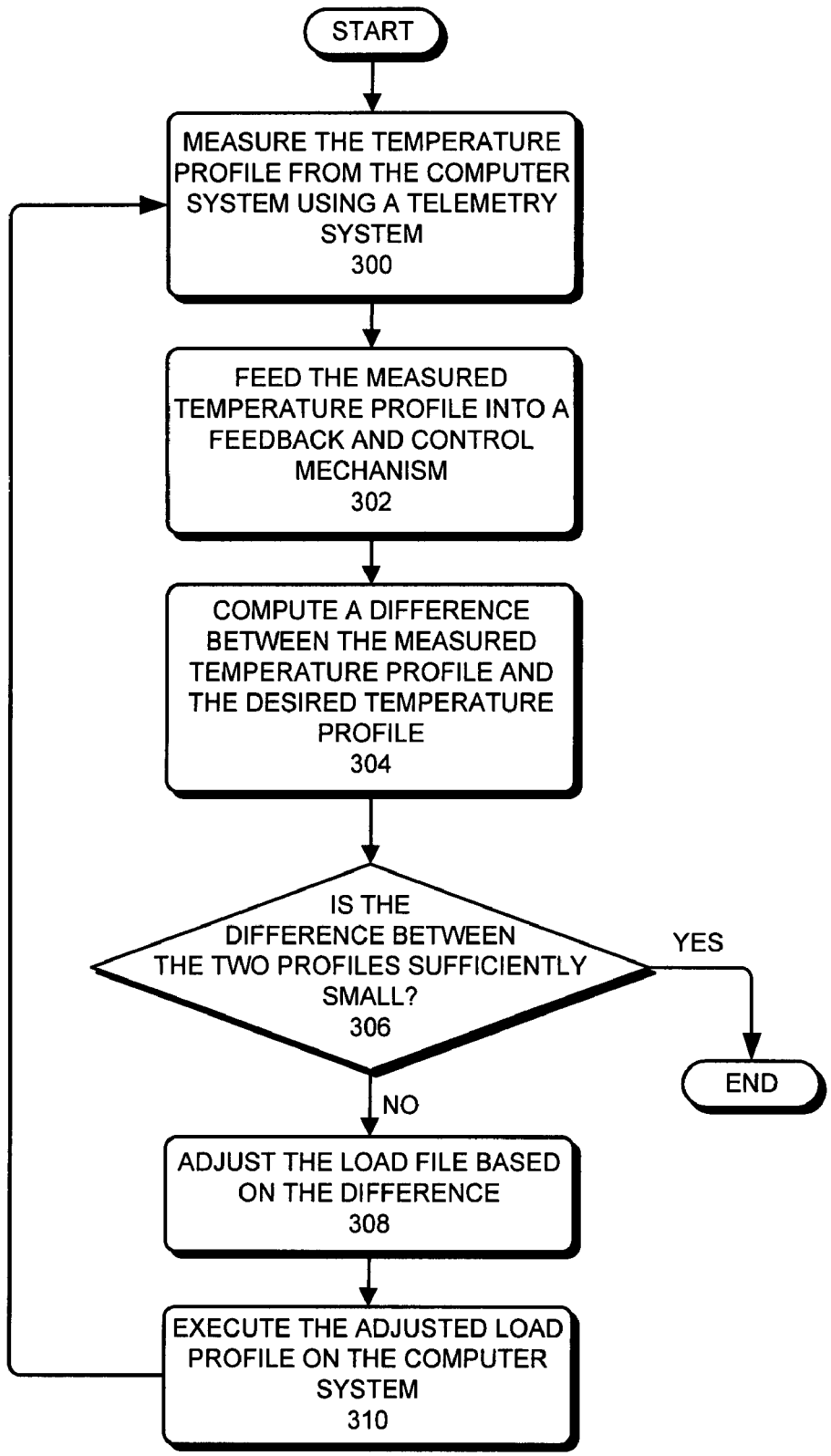
FIG. 3 presents a flowchart illustrating the process of obtaining the desired temperature profile in the computer system using a feedback-and-control mechanism in accordance with embodiments of the present invention.

FIG. 3 presents a flowchart illustrating the process of obtaining the desired temperature profile in the computer system using a feedback-and-control mechanism in accordance with embodiments of the present invention. During operation, a telemetry system is used to measure the temperature profile from the computer system (step 300). For example, the telemetry system can measure the temperature of components in the computer system using embedded temperature sensors in the components. The telemetry system then feeds the measured temperature profile into a feedback-and-control mechanism (step 302).

Next, the feedback-and-control mechanism computes a difference between the measured temperature profile and the desired temperature profile (step 304) and determines if the difference between the two profiles is sufficiently small (step 306). The difference is sufficiently small when the difference between the two profiles is relatively small compared to the amplitude of the desired temperature profile. In some embodiments, a difference of a degree is sufficiently small, while other embodiments permit larger or smaller differences.

If the difference is not sufficiently small, the system adjusts the load profile based on the difference (step 308). For example, the feedback-and-control mechanism can cause load-generation code 112 to generate a sequence of instructions wherein operations are performed less frequently or more frequently according to whether the temperature profile is above or below the desired temperature profile.

Next, the system executes the adjusted load profile on the computer system (step 310). The system then returns to step 300 and repeats the process. If necessary, the system repeats the process a number of times, eventually causing the generated temperature profile to be sufficiently close to the desired temperature profile.

CONCLUSION

Embodiments of the present invention use an in-situ thermal margining technique to perform temperature-dependent reliability studies on a computer system. This has several benefits in comparison to a thermal chamber test: (1) computer system operations can be monitored in real-time while the computer system is being temperature-cycled; whereas for conventional accelerated-life studies (in thermal chambers), real-time monitoring in conjunction with reliability tests can be logistically difficult; (2) the in-situ thermal margining can be conducted at repair centers, in manufacturing and Ongoing Reliability Testing (ORT) labs, and even at customer sites for stubborn failure mechanisms that resist-root cause analysis confirmation; and (3) using in-situ thermal margining, the onset of a temperature dependent computer system failures can be detected, and the exact times when computer system failures occur can be accurately identified. In comparison, conventional thermal chamber testing only counts failures after fixed testing windows, e.g., 100 hrs or 500 hrs, etc. Being able to obtain the exact times of failures facilitates much more accurate long term reliability projections.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically controlling a temperature profile within a computer system by generating computer system activity, comprising:
   receiving a desired temperature profile that specifies a temperature pattern that is to be caused within the computer system;
   generating a load profile based on the desired temperature profile, wherein the load profile specifies operations to be performed by the computer system; and
   executing the load profile on the computer system to generate computer system activity, wherein the computer system activity causes the desired temperature profile in the computer system.

2. The method of claim 1, wherein the method is performed in a feedback and control loop to facilitate obtaining the desired temperature profile in the computer system.

3. The method of claim 2, wherein obtaining the desired temperature profile using the feedback and control loop involves:
   measuring a current temperature profile of the computer system;
   computing a difference between the current temperature profile and the desired temperature profile;
   adjusting the load profile based on the difference; and
   executing the adjusted load profile on the computer system.

4. The method of claim 3, wherein measuring the temperature profile of the computer system involves using a telemetry system to measure at least one temperature in the computer system.

5. The method of claim 1, wherein generating the load profile involves specifying a level of activity for at least one component in the computer system based on an amplitude and a period of the desired temperature profile.

6. The method of claim 5, wherein specifying a level of activity for at least one component in the computer system involves generating a sequence of computer system operations that cause the at least one component to perform at the level of activity.

7. The method of claim 1, further comprising:
   monitoring the computer system to detect a temperature dependent computer system failure; and if a computer system failure occurs, recording the time and conditions of the failure when the computer system failure occurs.

8. The method of claim 1, wherein the desired temperature profile is cyclical, which facilitates performing an accelerated temperature reliability test on the computer system.

9. A computer-readable storage medium storing instructions that when executed by a computer cause the computer to perform a method for dynamically controlling a temperature profile within a computer system by generating computer system activity, the method comprising:
   receiving a desired temperature profile that specifies a temperature pattern that is to be caused within the computer system;
   generating a load profile based on the desired temperature profile, wherein the load profile specifies operations to be performed by the computer system; and
   executing the load profile on the computer system to generate computer system activity, wherein the computer system activity causes the desired temperature profile in the computer system.

10. The computer-readable storage medium of claim 9, wherein the method is performed in a feedback and control loop to facilitate obtaining the desired temperature profile in the computer system.

11. The computer-readable storage medium of claim 10, wherein obtaining the desired temperature profile using the feedback and control loop involves:
   measuring a current temperature profile of the computer system;
   computing a difference between the current temperature profile and the desired temperature profile;
   adjusting the load profile based on the difference; and
   executing the adjusted load profile on the computer system.

12. The computer-readable storage medium of claim 11, wherein measuring the temperature profile of the computer system involves using a telemetry system to measure at least one temperature in the computer system.

13. The computer-readable storage medium of claim 9, wherein generating the load profile involves specifying a level of activity for at least one component in the computer system based on an amplitude and a period of the desired temperature profile.

14. The computer-readable storage medium of claim 13, wherein specifying a level of activity for at least one component in the computer system involves generating a sequence of computer system operations that cause the at least one component to perform at the level of activity.

15. The computer-readable storage medium of claim 9, further comprising:
   monitoring the computer system to detect a temperature dependent computer system failure; and
   if a computer system failure occurs, recording the time and conditions when the computer system failure occurs.

16. The computer-readable storage medium of claim 9, wherein the desired temperature profile is cyclical, which facilitates performing an accelerated temperature reliability test on the computer system.

17. A computer system that dynamically controls a temperature profile within the computer system by generating computer system activity, comprising:
   a processor;
   a memory coupled to the processor, wherein the memory stores data and instructions for the processor;
   a receiving mechanism configured to receive a desired temperature profile that specifies a temperature pattern that is to be caused within the computer system;
   a generating mechanism coupled to the receiving mechanism, wherein the generating mechanism is configured to generate a load profile based on the desired temperature profile, wherein the load profile specifies operations to be performed by the computer system; and
   an execution mechanism on the processor, wherein the execution mechanism is configured to execute the load profile to generate computer system activity, wherein the computer system activity causes the desired temperature profile in the computer system.

18. The computer system of claim 17, further comprising a feedback-and-control mechanism configured to:
   use a telemetry system to measure a current temperature profile of the computer system;
   compute a difference between the current temperature profile and the desired temperature profile;
   wherein the generation mechanism is configured to generate an adjusted load profile if the difference is sufficiently large; and
   wherein the execution mechanism is configured to execute the adjusted load profile to generate computer system activity.

19. The computer system of claim 17, wherein the load profile is comprised of a sequence of computer system operations that cause at least one component in the computer system to perform at a level of activity based on an amplitude and a period of the desired temperature profile.

20. The computer system of claim 17, further comprising:
   a monitoring mechanism configured to monitor the computer system to detect a temperature-dependent computer system failure; and
   a recording mechanism configured to record the time and conditions of the failure if a computer system failure occurs.

* * * * *